Feb. 10, 1942.   H. R. BLACK   2,272,930
FROTHED GLASS BLOCK APPARATUS
Filed March 19, 1938
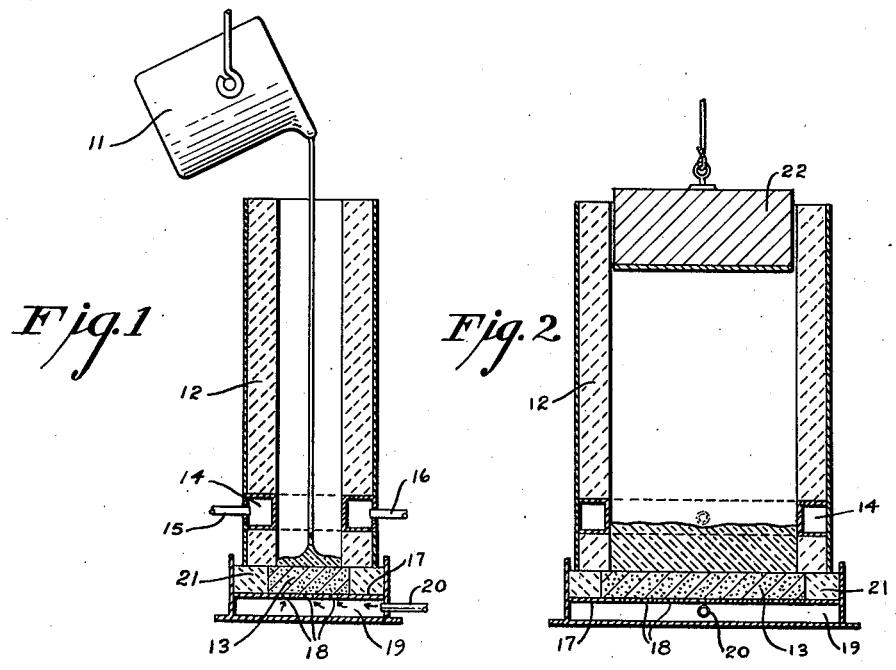
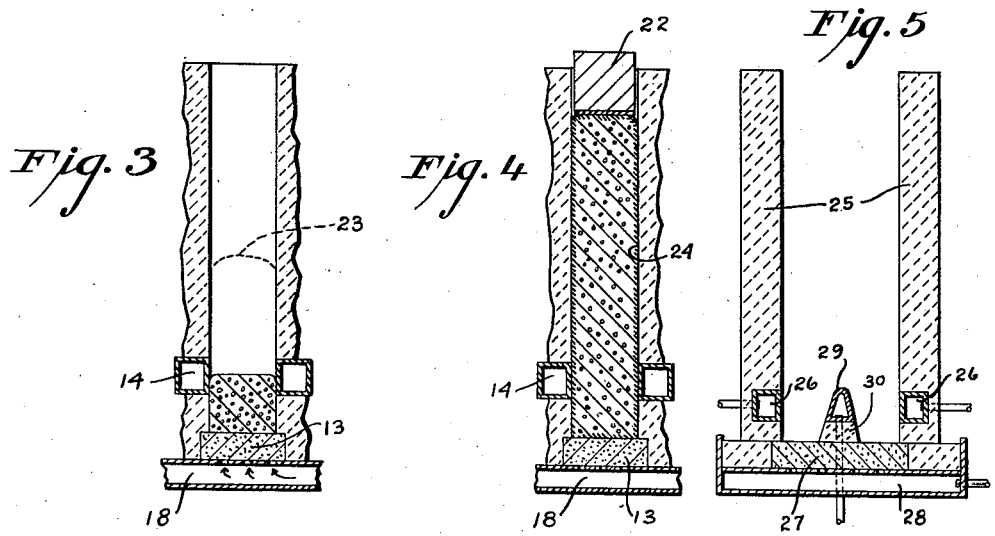
INVENTOR.
HENRY R. BLACK
BY *Horsey, Cole + Garner*
ATTORNEYS.

Patented Feb. 10, 1942

2,272,930

UNITED STATES PATENT OFFICE 2,272,930

FROTHED GLASS BLOCK APPARATUS

Henry R. Black, Corning, N. Y.

Application March 19, 1938, Serial No. 196,988

10 Claims. (Cl. 49—65)

This invention relates to the manufacture of building units from molten siliceous materials and more particularly to a means and method for simultaneously foaming the molten material and molding it into units of the desired size and shape.

Since slags are an inevitable by-product of the refining of metal bearing ores, many attempts have been made to utilize them in the formation of building units. More recently various glass building units have appeared on the market. Since these materials have a relatively high density, attempts have been made to reduce the weight of finished units by including therein as large a percentage of voids as possible. This has been done either by forming hollow blocks from pressed sections or porous blocks containing a large number of relatively small voids thruout the body of the block. Slags have commonly been rendered porous by introducing water or other gas forming substances therein after which the foamed material has been molded while still plastic or cooled, crushed and used as concrete aggregate. Porous glass units have been formed by using unrefined glass melts having quantities of bubbles therein and expanding charges of such glass in molds under reduced pressure. In both these processes the foaming of the molten material and its manufacture into building units have been separate and distinct steps.

The object of the present invention is an improved lightweight building unit formed of slag, glass or other molten siliceous material.

A further object of the invention is an improved method of forming building units from molten materials.

A still further object of the invention is a molding device including means for foaming and for solidifying charges of molten material placed therein.

The present invention may best be explained in conjunction with the accompanying drawing in which:

Fig. 1 is an elevation, partially in section, of the mold and charging apparatus;

Fig. 2 is a transverse sectional elevation of the mold and cover block;

Fig. 3 is a fragmentary view of the interior of the mold shortly after charging;

Fig. 4 is a fragmentary view of the interior of the mold at the end of the molding operation; and Fig. 5 is a transverse sectional elevation of a modified mold structure.

A major departure of the present invention from the prior art lies in individually frothing separate charges of molten material within confining receptacles. Prior to this invention the commonly accepted method of frothing slags has been to flow them over a moistened surface, the resultant steam bubbling thru the molten stream and being partially retained therein. In this process the under surface of the stream receives the greatest amount of chilling, particularly when in direct contact with a stream of water, and the tendency is for bubbles to combine within the more molten body of the stream and in many cases to escape from the surface thereof. Thus the final product contains a relatively small number of large cavities which materially detract from its strength and insulating ability. In the present invention individual charges of highly fluid molten material are placed in closed containers where steam or other gaseous material is bubbled thru them. Since the charges are confined and highly fluid, this introduction of gas under the charge results in a mixing of the material from top to bottom so that the temperature thruout the charge remains substantially uniform as it is cooled by the frothing gases. However, additional cooling is provided adjacent the upper surface of the charge and as the temperature is lowered a skin forms on this upper surface which traps the bubbles of gas within the charge and it begins to increase in volume. By this time the body of the charge has increased in viscosity to a point where there is little tendency for the individual bubbles to break down the dividing walls and combine to form larger bubbles. Thus if the frothing gases are introduced beneath the charge in small amounts at a vast number of separate points a multiplicity of fine bubbles will be formed and retained within the charge and a very uniform, finely pored product will result.

A molding device embodying the principles of the present invention is shown in Figs. 1 and 2 and includes an open topped mold or container adapted to receive a charge of molten material direct from a ladle 11 or any other convenient source. The container is formed with refractory walls 12 of moderate conductivity and a porous refractory bottom 13 which, as shown, may consist of porous insulating brick commonly known in the art. A hollow metal section 14 is built into the walls of the mold a short distance above the porous bottom and is provided with inlet and outlet pipes 15 and 16 respectively, for the circulation of cooling fluid. The entire structure is supported on a plate 17 which contains perforations 18 directly below the porous bottom 13. This plate constitutes the upper wall of a closed chamber 19 to which water or other fluid frothing media is supplied at regulated pressure thru pipe 20. In the present instance water under a head of from 3 to 6 inches is preferred but air or other inert gases under moderate pressure have been found satisfactory. The periphery of the porous bottom may be sealed in any suitable manner as by refractory 21. A removable cover block 22 designed to fit loosely within the top of the mold is also provided.

In operating the above described device in accordance with the present invention, the mold is charged with highly heated slag or glass to a point opposite the water cooled insert 14 and preferably to a point opposite the lower edge thereof. Prior to charging the mold, pressure is applied to the chamber 18 and the frothing media is forced thru the pores of the bottom 13. If water is used a thin film is permitted to collect on the surface of the brick before the mold is charged. Immediately the molten material comes in contact with the frothing media a violent agitation of the charge commences due to the stirring action of the gas bubbles passing upward thru the charge. This initial stage of the process is illustrated in Fig. 3. As the bubbles continue to rise thru the charge its temperature is uniformly reduced and its viscosity increased. During these proceedings the upper portion of the charge, particularly the upper surface, is subjected to the cooling effect of the cooled insert 14 so that the temperature of the upper surface is always slightly below that of any other portion of the charge. Thus a viscous skin eventually forms which is too tough to be ruptured by the bubbles of gas rising thru the charge. These bubbles then collect beneath the skin and as the pressure builds up the charge gradually expands filling the mold and taking on its contours. An intermediate stage of this expansion is shown in dotted lines at 23 in Fig. 3. As the bubbly mass rises in the mold each section in turn passes thru the cooled insert 14 and is chilled thereby. While the primary result is a firmly set-up skin 24 on the surface of the mass the interior is likewise cooled somewhat and any tendency of the fine bubble structure to break down into large bubbles is further inhibited. If the charge and amount of frothing fluid have been properly proportioned very little, if any, molten material remains when the charge has filled the mold and the only effect of further introduction of frothing fluid is to set up a skin on the lower part of the charge similar to that created on the remainder by insert 14. When this has taken place the mold may be opened and the molded unit removed for annealing in the usual manner.

While the apparatus shown in Figs. 1–4 is capable of producing a porous slag product of superior characteristics in the manner described above, it contains certain inherent limitations. These relate to the thickness of the article which can be produced for, if the cooling sections are spaced too far apart the mold charge will not be properly cooled in its interior as it expands and a single larger opening is apt to be formed in the center of the resulting product. To overcome these difficulties the mold structure may be modified as shown in cross section in Fig. 5. This structure consists of refractory side walls 25 in which are positioned water cooled members 26. Foaming fluid is supplied to a porous mold bottom 27 from reservoir 28. Supplemental cooling means are positioned centrally of the mold cavity and extending across its entire width. This cooling means consists of a water cooled metal member 29 supported on a block 30 of refractory material.

The operation of this structure is essentially the same as that of the mold in Figs. 1–4. Molten siliceous material is introduced into the mold on either side of the cooling member 29 where they come in contact with the porous material and bubble violently. As a skin cools on the upper surface the separate masses of material expand passing between cooling members 26 and 29 and are chilled sufficiently to set the foam structure. However, these masses of material weld together as they meet above cooling member 29 and a homogeneous uniformly cooled product is produced. If it is desired to produce articles of extreme width and thickness a plurality of cooling members similar to 29 may be positioned in the mold cavity. In other instances water cooled pipes and similar metallic bodies spaced from the mold floor may be used as cooling members and allowed to remain in the finished article as reinforcing.

Porous building units made in the above described manner are found to have superior strength and uniformity of weight and thermal characteristics. This is believed to be due to the fine uniform porous structure in which the majority of the invidual cavities have a diameter of less than 1 millimeter while the remainder have diameters not exceeding 3 millimeters. Such a product has been found to have a weight of from 25–50 pounds per cubic foot, a conductivity of from .8 to 1.0 B. t. u. sq. ft./in./°F./hour and a compressive strength of from 400 to 1150 pounds/sq. in., according to the composition of the molten material and the degree to which frothing is permitted to proceed.

While a particular structure has been described by way of illustration of a suitable means for performing the invention, it is to be understood that numerous modifications may be made therein without departing from the teachings of the invention and the scope of the invention is to be limited solely by the terms of the appended claims.

I claim:

1. In a device for forming porous vitreous articles, a mold having refractory side walls and bottom of relatively low thermal conductivity, and a cooled metallic insert having a vertical height substantially less than the height of said refractory side walls positioned in said side walls adjacent said bottom, said insert being exposed in the mold cavity.

2. In a device for forming porous vitreous articles, a mold having refractory side walls of relatively low thermal conductivity and a porous bottom forming a mold cavity, means for introducing fluid media into said mold cavity thru said porous bottom, and a cooled metallic insert of high thermal conductivity positioned in said side walls adjacent said bottom, said insert forming a restricted portion of the bounding wall of the mold cavity.

3. In a device for forming porous vitreous articles, a mold adapted to receive a charge of molten material, means for bubbling gaseous media thru said charge to cause it to foam, and means built into the walls of said mold at a point intermediate the top and bottom of the mold for cooling the foam and setting it as it is formed.

4. In a device for forming porous vitreous articles, a mold of relatively low thermal conductivity adapted to receive a charge of molten material, a porous bottom in said mold, means for introducing fluid into said mold thru said bottom, and localized cooling means positioned adjacent said porous bottom and forming an exposed portion of the mold cavity wall, said cooling means comprising a hollow metal member, and means for circulating cooling fluid thru said hollow member.

5. The method of forming porous articles from molten material which comprises confining a charge of molten material against lateral movement, introducing a gaseous material into said charge at a multiplicity of points in the under surface thereof and simultaneously exerting a localized cooling effect on another portion of said charge in a zone located intermediate the upper and lower surfaces of said charge, thereby causing the foam within said zone to set up.

6. The method of forming porous articles from molten material which comprises confining a charge of molten material against lateral movement while supported on a porous body, uniformly cooling and stirring the entire charge by forcing a gaseous material through the pores of said body and into said charge, and simultaneously subjecting the upper surface of said charge to a localized cooling action to solidify the same and prevent the escape of the gaseous material from the charge.

7. The method of forming porous articles from molten material which comprises confining a charge of molten material against lateral movement, introducing a gaseous material into said charge thru the under surface thereof at a multiplicity of spaced points to form bubbles of gas therein, confining said bubbles beneath the upper surface of said charge, to form a foam and progressively chilling and setting said foam as it is formed and collects in a zone intermediate the upper and lower surfaces of said charge.

8. The method of forming porous articles from molten material which comprises confining a charge of molten material against lateral movement, foaming said charge by the introduction of gaseous material therein at a multiplicity of points beneath its surface thereby causing said charge to expand and fill the mold, and progressively locally chilling and setting said charge as it expands.

9. The method of forming porous molded articles from molten material which comprises placing a body of molten material in a mold, inducing said body to expand and fill the mold, and progressively chilling transverse sections of said body as it moves within the mold.

10. The method of forming porous molded articles from molten material which comprises placing a charge of molten material in a mold, introducing a frothing material into said charge uniformly throughout its lower surface to form fine bubbles within the charge and cause it to expand and fill the mold and cooling said charge as it expands by causing it to pass between localized cooling bodies, whereby the viscosity of the charge about the bubbles is raised and their consolidation into larger bubbles is inhibited.

HENRY R. BLACK.